June 1, 1954
L. E. ERIE
2,679,852
DIPPING MACHINE FOR BAGGED FOODSTUFFS AND OTHER ARTICLES
Filed May 15, 1952
4 Sheets-Sheet 2
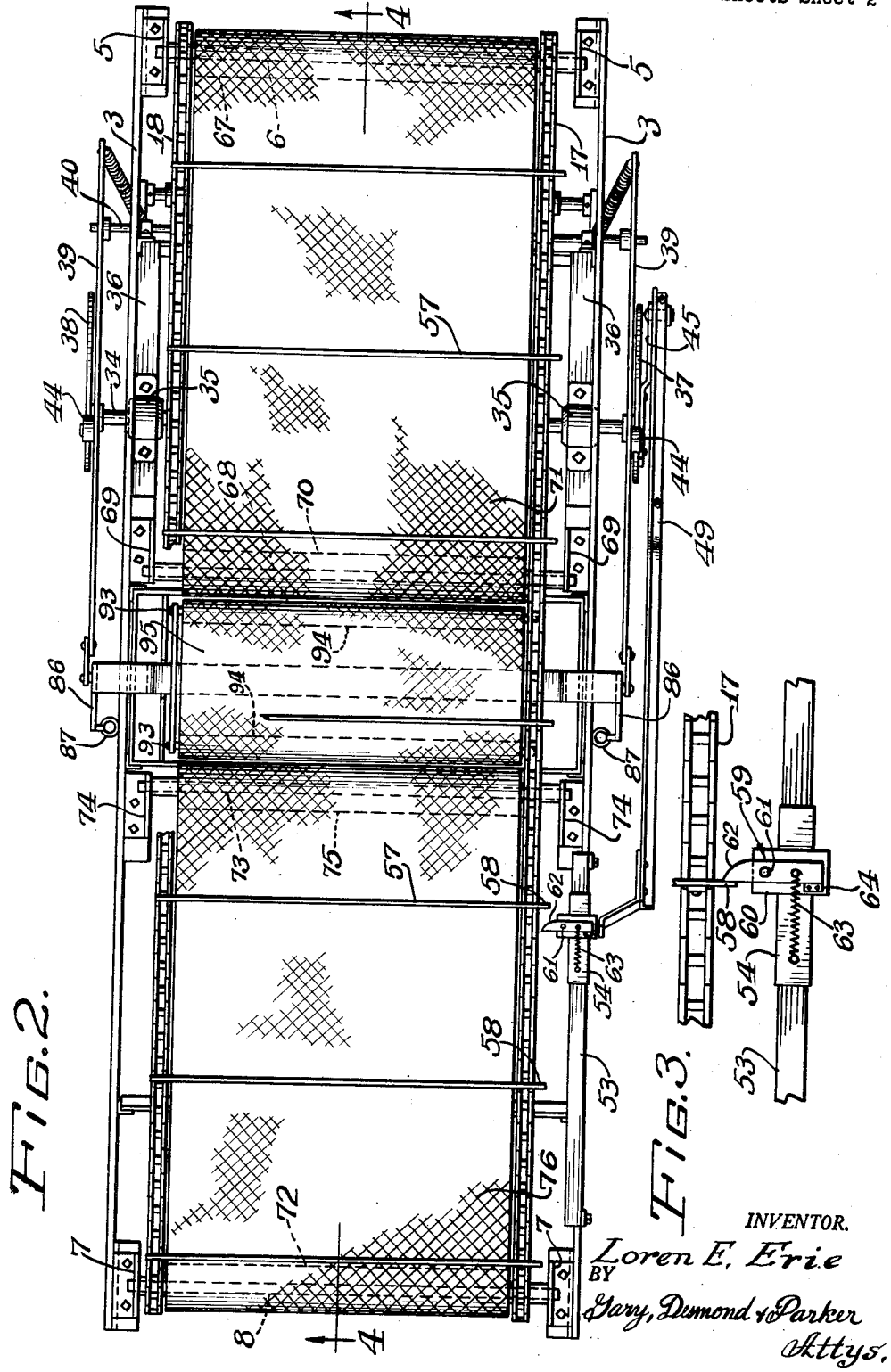
INVENTOR.
Loren E. Erie
BY
Gary, Dumond & Parker
Attys.

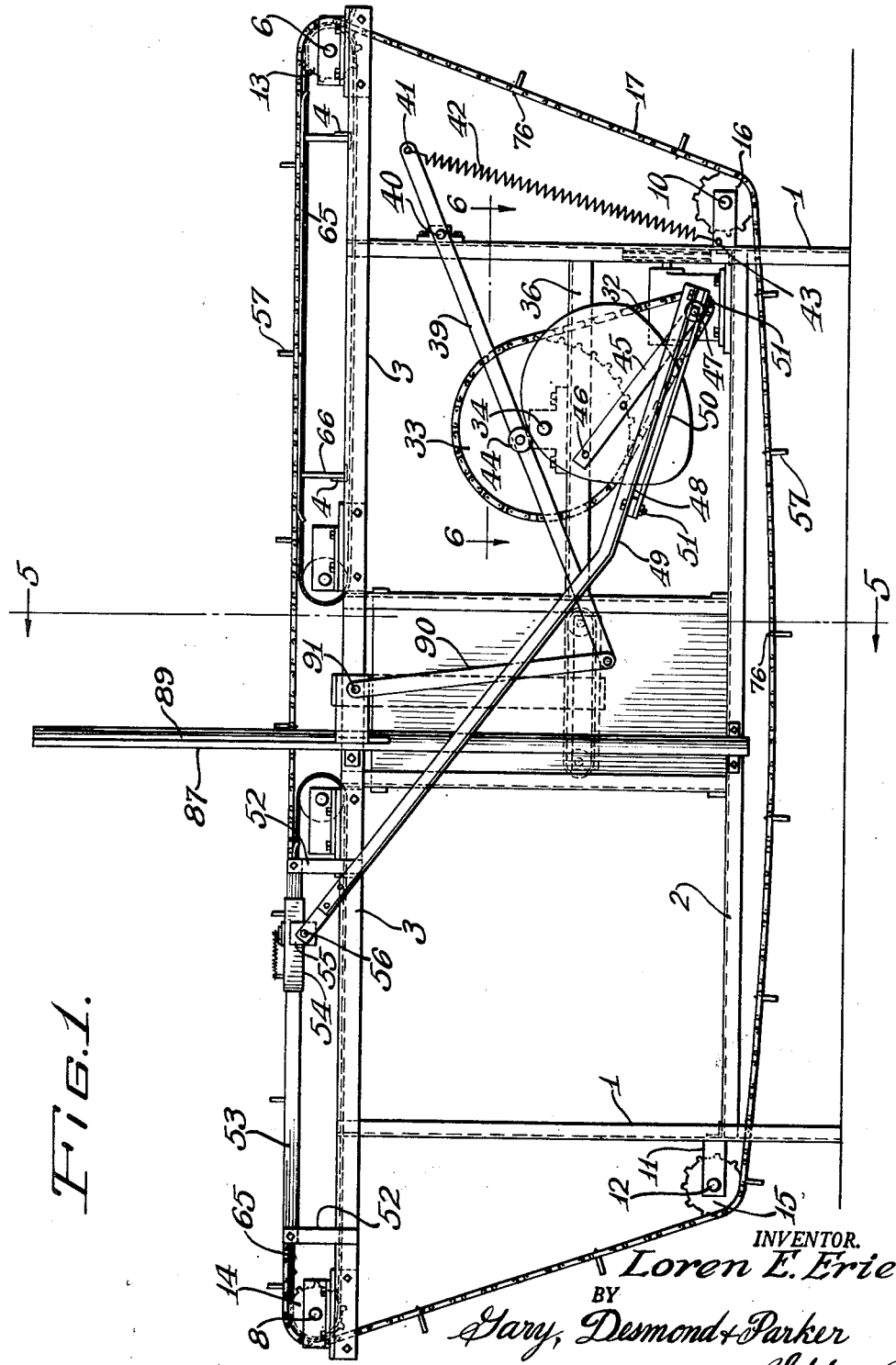

June 1, 1954 L. E. ERIE 2,679,852
DIPPING MACHINE FOR BAGGED FOODSTUFFS AND OTHER ARTICLES
Filed May 15, 1952 4 Sheets-Sheet 3

INVENTOR.
*Loren E. Erie*
BY
*Gary, Desmond & Parker*
*Attys.*

June 1, 1954     L. E. ERIE     2,679,852
DIPPING MACHINE FOR BAGGED FOODSTUFFS AND OTHER ARTICLES
Filed May 15, 1952     4 Sheets-Sheet 4
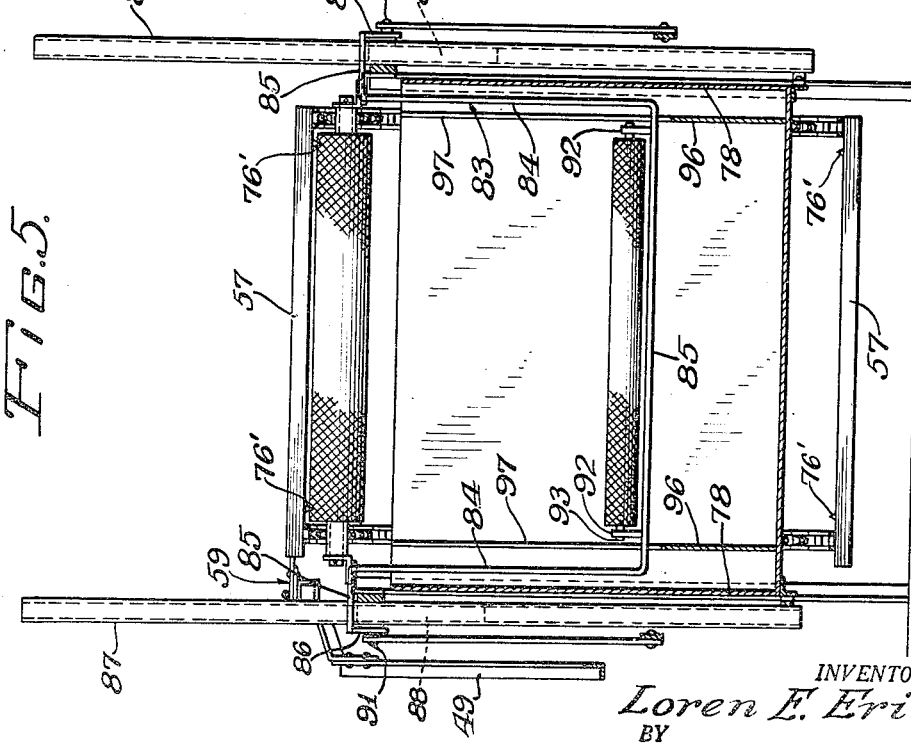
INVENTOR.
Loren E. Erie
BY
Gary, Desmond & Parker
Attys.

Patented June 1, 1954

2,679,852

UNITED STATES PATENT OFFICE 2,679,852

DIPPING MACHINE FOR BAGGED FOOD-STUFFS AND OTHER ARTICLES

Loren E. Erie, Rock Island, Ill.

Application May 15, 1952, Serial No. 287,877

8 Claims. (Cl. 134—127)

1

This invention relates to improvements in a machine for dipping articles in a bath, and refers particularly to a machine wherein articles to be dipped are automatically conveyed intermittently to a dipping bath, dipped in said bath, and intermittently conveyed away from the dipping bath.

One of the important features of the present invention resides in the provision of an elevator member which moves downwardly into a bath and moves upwardly from said bath, said elevator member comprising an endless conveyor which may be operated to facilitate the movement of an article onto the elevator member and movement off of the elevator member after the dipping operation, said endless conveyor being operated in timed relationship with a charging conveyor and a discharge conveyor.

Another important feature of the invention resides in a single means for simultaneously moving a charging conveyor, a discharge conveyor and a conveyor carried by an elevator member, all of said conveyors being moved intermittently together.

Other objects and advantages of the present invention will be apparent from the accompanying drawings and following detailed description.

In the drawings:

Fig. 1 is a side elevational view of my improved dipping machine.

Fig. 2 is a top plan view of the machine as shown in Fig. 1.

Fig. 3 is a fragmentary view illustrating the pawl engagement for driving the sprocket chains.

Fig. 5 is a transverse sectional view taken on line 5—5 of Fig. 1.

Fig. 6 is a detailed sectional view taken on line 6—6 of Fig. 1 and illustrating the drive for the machine.

Figure 4:
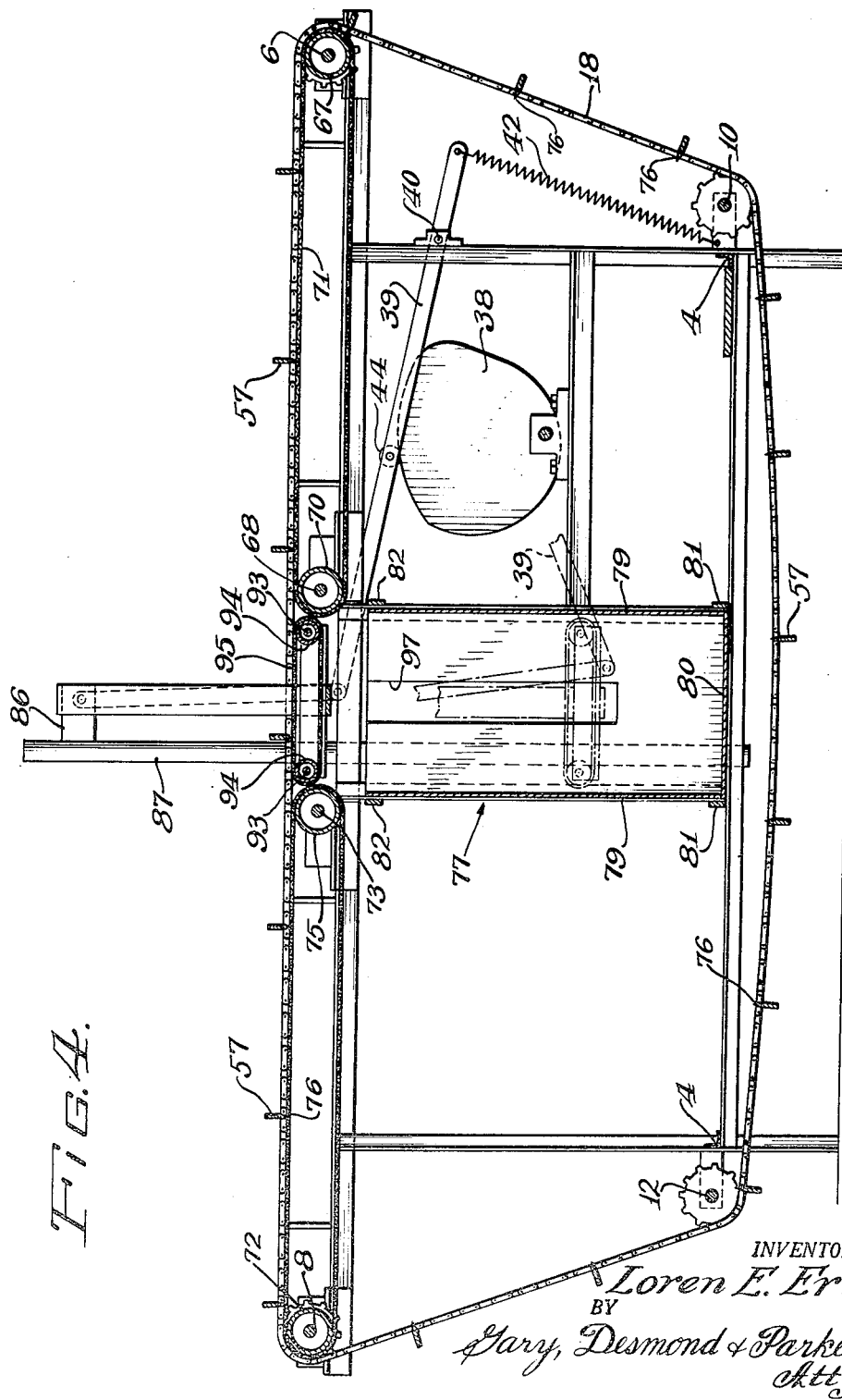
Fig. 4 is a longitudinal sectional view taken on line 4—4 of Fig. 2.

Referring in detail to the drawings, 1, 1 indicate vertical supporting members for the frame of the machine, said members being connected together by means of longitudinal frame members 2 and 3 and also being joined by means of transverse frame members 4, the various members being secured together, preferably by welding, in order to form a rigid frame for the machine.

Lugs 5 are mounted upon the upper longitudinal frame members 3 adjacent one end thereof, said lugs being adapted to support a rotatable shaft 6. Similarly, at the opposite end of the upper frame members 3 lugs 7 are carried which support a transverse shaft 8. A pair of hangers 9 are carried upon legs 1, said hangers being positioned beneath shaft 6 and being adapted to support a transverse shaft 10. Similarly, a pair of hangers 11 are carried by the legs 1 at the opposite end of the machine, that is, beneath the shaft 8, said hangers being adapted to support a transverse shaft 12.

A pair of sprocket wheels 13 are carried upon shaft 6 adjacent the ends of said shaft. In similar fashion a pair of sprocket wheels 14 are carried upon shaft 8, the sprocket wheels 14 being in alignment with the respective sprocket wheels 13. Pairs of sprocket wheels 15 and 16 are respectively mounted upon shafts 12 and 10, said sprocket wheels being in respective alignment with each other and in alignment with the respective sprocket wheels 13 and 14. Over each set of sprocket wheels 13, 14, 15 and 16 an endless sprocket chain 17 is trained and similarly, over the remaining set of sprocket wheels 13, 14, 15 and 16 at the opposite side of the machine, a sprocket chain 18 is trained. As will be hereinafter more fully described, the sprocket chains 17 and 18 are driven in timed relationship around the various sprocket wheels hereinbefore described.

Referring particularly to Fig. 6, the drive for the machine is illustrated. A platform 19 is disposed transversely across the machine and is carried at its opposite ends upon the lower longitudinal frame members 2. An electric motor 20 is mounted upon platform 19, said motor being carried upon a frame 21 whereby, by the manipulation of wheel 22 which operates screw 23 the motor 20 may be moved a predetermined distance in either direction along the length of the platform 19. Shaft 24 of motor 20 carries a pair of split pulleys 25, said pulley halves being adapted to move toward or away from each other when a predetermined tension is applied to a conventional V-belt 26 which may be carried between the pulley halves. The driving arrangement comprising the split pulleys 25 is conventional and is adapted to be employed to change the effective diameter of the driving pulley of the motor. A conventional speed reducer 27 is also mounted upon platform 19 and the input shaft 28 of said speed reducer carries a pulley 29 over which the belt 26 is trained. It can readily be seen that by manipulating screw 22 the motor may be moved toward or away from the speed reducer 27 and hence the tension of belt 26 may be decreased or increased whereby the pulley halves 25 will move toward or away from each other changing the relative diameter ratios of the motor pulley and the input pulley 29 of the speed reducer 27.

The speed reducer 27 has an output shaft 30 which carries a sprocket pinion 31. A sprocket chain 32 is trained around the pinion 31 and is also trained around a sprocket wheel 33 carried upon shaft 34. The shaft 34 is the main drive shaft for the machine and is journaled in bearings carried by pillow blocks 35 which are mounted upon opposite sides of the machine upon frame members 36. As will be hereinafter more fully described, the motor 20 is operated continuously and the drive shaft 34 also rotates continuously.

A cam 37 is mounted upon one end portion of drive shaft 34, said end portion of the drive shaft extending outwardly from the front side of the machine. Similarly a cam 38 of identical shape with cam 37 is mounted upon the opposite end portion of the drive shaft 34, that is, that portion of the drive shaft which extends outwardly from the rear of the frame of the machine. A lever 39 is pivotally secured as at 40 in Fig. 1 upon the upper portion of a leg 1 and an identical lever 39 is similarly pivotally mounted upon an opposite leg of the machine. An end of each of said levers 39 is provided with an opening 41 in which the end of a coil spring 42 is anchored, the opposite end of said coil spring being anchored in an aperture 43 provided in hanger 9. It is to be understood that each of the levers 39 has its end spring biased in the same fashion. Each of the levers 39 at an intermediate portion of its length carries a follower roller 44, the follower rollers being adapted to ride upon the peripheries of the cams, one follower roller 44 riding upon periphery of cam 37 and the other follower roller riding upon the periphery of cam 38. The arrangement is such that when the drive shaft 34 is rotated the cams 37 and 38, in rotating, rock levers 39 upwardly and downwardly about their respective pivots 40.

A crank arm 45 is mounted upon the face of cam 37, said crank arm being secured to the cam by means of screws or the like 46. A pin 47 is carried upon the end of the crank arm 45 and said pin is positioned in a slot 48 defined by an end portion of arm 49 and a guide member 50, said guide member being secured to arm 49 by means of bolts 51 and being disposed in spaced relationship with respect to the end portion of arm 49 thereby providing the slot 48. The arrangement is such that when the drive shaft 34 rotates thereby rotating cam 37, arm 45 is rotated with said cam and the pin 47 moves about the axis of shaft 34 as a center. At a predetermined position of the arm 49 with respect to the crank 45 the pin 47 moves through the slot 48 thereby providing a lost-motion connection between the arm 49 and the crank arm 45. The purpose of this arrangement will be hereinafter more fully described.

On the same side of the machine with cam 37 and arm 49, that is, the front side of the machine, a pair of standards 52 are mounted upon an upper frame member 3. The upper end of the standards 52 carry a rectangular sectioned guide bar 53 upon which a similarly sectioned sleeve 54 is adapted to slide. A lug 55 is mounted upon the sleeve 54 and an end of arm 49 is pivotally secured to said lug as at 56 in Fig. 1. A plurality of spaced transverse spacer bars 57 are mounted upon the opposite chains 17 and 18, the spacer bars 57 being so positioned upon chain 17 that an end portion 58 of each of said bars extends outwardly from chain 17. A pawl 59 is pivotally secured to a block 60 as at 61 in Fig. 3. One end of the pawl 59 is formed with a curved side 62, similar to the keeper of the usual door lock, and the opposite end of the pawl is secured to a coil spring 63 which is anchored at its opposite end upon sleeve 54. A stop member 64 is carried upon block 60 and functions to limit the movement of the pawl 59 under the influence of spring 63.

The arrangement is such that during the rotation of the drive shaft 34 the arm 49 functions to move the sleeve 54 backwardly and forwardly along guide bar 53. By virtue of the lost-motion connection between the crank arm 45 and the arm 49 the sleeve 54 does not move continuously since within a predetermined angular movement of the crank arm 45 the sleeve remains stationary while the pin 47 carried by the crank arm 45 moves through the slot 48. In other words, there is a dwell of the sleeve 54 at one portion of its movement. The geometrical relationship of the parts is such that when the sleeve 54 moves forwardly along the guide bar 53, that is, when said sleeve moves from right to left as viewed in Figs. 1, 2 and 3, the pawl 59 is engaged behind the protruding end 58 of a spacer bar 57 and hence during such movement of the sleeve the spacer bar 57 is moved from right to left as viewed in Figs. 1, 2 and 3. The timing arrangement is such that the sleeve 54 after reaching its endmost position immediately moves backwardly, that is, from left to right as viewed in Figs. 1, 2 and 3. The total length of movement of sleeve 54 along the guide bar 53 is greater than the distance between adjacent spacer bars 57 and hence the curved portion 62 of the pawl 59 contacts the next adjacent guide bar 57. The pawl arrangement is such that when such contact is made said pawl rocks about pivot 61 permitting movement of the pawl past the protruding end 58 of the guide bar 57 in question. After the pawl 59 has moved past said guide bar the timing arrangement is such that the pin 47 carried by the crank arm 45 commences its movement through the slot 48 and hence the sleeve remains stationary during the period that the pin 47 moves through the slot 48. After the pin 47 completes its movement through the slot 48, the sleeve 54 then moves forwardly, that is, from right to left along the guide bar 53 and the spacer bar adjacent the pawl 59 is moved in the same direction. In view of the fact that the spacer bars 57 are rigidly secured to the chains 17 and 18, said chains are intermittently moved in the fashion hereinbefore described.

In order that the chains 17 and 18 do not sag excessively during their upper pass and that the upper pass of said chains is maintained substantially horizontally, chain support plates 65 are positioned upon the upper frame members 3, said support plates being carried by upwardly extending brackets 66 mounted upon the frame members 3. During movement of the chains 17 and 18, the major portion of the upper passes of said chains occurs while in supported relationship by the plates 65.

A roll 67 is mounted upon shaft 6 between the sprocket wheels 13. A shaft 68 is journaled in opposite brackets 69 carried by the upper frame members 3 and said shaft also carries a roll 70. A flexible endless conveyor 71 is trained around rolls 67 and 70, said conveyor preferably comprising a flexible wire mesh structure. A roll 72 is mounted upon shaft 8 and a shaft 73 is journaled in opposite brackets 74, said brackets being carried upon the upper frame members 3. The shaft 73 carries a roll 75 and a flexible conveyor 76 similar to the conveyor 71 is trained around rolls 72 and 75.

Secured to each of the spacer bars 57 and extending downwardly therefrom are a plurality of driving lugs 76', said lugs being adapted to engage in the interstices of the mesh conveyors 71 and 76. Hence, when the chains 17 and 18 are moved, as hereinbefore described, the driving lugs 76 carried by the spacer bars 57 and protruding downwardly into the meshes of the conveyors 71 and 76 function to drive the upper passes of the conveyors 71 and 76. In this fashion both conveyors 71 and 76 are intermittently moved in the same direction during the intermittent movement of the chains 17 and 18.

A tank or vat 77 having end walls 78 and side walls 79 and bottom 80 is positioned upon an intermediate portion of the tank or vat 77, being supported by lower frame members 2 and cross members 81, and the open portion of the vat being supported by the upper frame members 3 and transverse members 82. The rolls 70 and 75 are spaced from each other a distance which is substantially equal to the width of the vat 77, that is, the distance between the opposite walls 79, hence, the vat 77 opens between the end of the path of travel of the conveyor 71 and the beginning of the path of travel of the conveyor 76.

As will be hereinafter more fully described, the tank or vat 77 is adapted to carry a liquid in which articles may be dipped. In dipping the articles, mechanism is provided for supporting the articles and carrying them downwardly into the vat and moving them upwardly after the dipping period has been completed. This mechanism comprises a substantially U-shaped strap 83 having opposite downwardly extending portions 84 and a horizontal portion 85. The upper ends of the vertical portions 84 extend outwardly as shown best at 85 in Fig. 5, each of said outwardly extending extensions 85 being secured to a guide bracket 86. A pair of opposite vertical guides 87 are mounted upon the frame of the machine adjacent vat 77, said guides being of hollow construction and being adapted to receive in telescopic fashion guide rods 88 which are secured to the members 86 which extend through vertical slots 89 provided in the valls of the hollow guides 87.

An end of each of the arms 39 is pivotally secured to a link 90 and the opposite end of each of said links is pivotally secured to the guide members 86, as shown best at 91 in Figs. 1 and 5. The arrangement is such that when the drive shaft 34 is rotated therby rotating cams 37 and 38, the arms 39 are moved, by virtue of the contact of the follower rollers 44 upon the periphery of the cams, in such fashion that the U-shaped strap 83 is moved upwardly and downwardly within the vat or tank 77, the vertical movement being accomplished through the agency of the guides 87 and guide rods 88 which move vertically within the guides 87.

Adjacent opposite vertical portions 84 of the U-shaped member 83 flanges 92 are mounted upon the horizontal portion 85. The flanges 92 are disposed transverse with respect to the horizontal portion 85 and at each end of each flange an aperture is provided for the reception of a pair of shafts 93. A roll 94 is carried upon each shaft 93 and an endless conveyor 95 is trained around the spaced rolls 94. The conveyor 95 comprises a mesh type of flexible conveyor similar to the conveyors 71 and 76.

It can readily be seen that when cams 37 and 38 function to raise the U-shaped member 83 the conveyor 95 carried by the horizontal portion of said U-shaped member moves upwardly and downwardly in the interior of the tank or vat 77. The arrangement is such that when the U-shaped member 83 is in its uppermost position, the upper pass of the conveyor 95 is disposed in the same plane with the upper passes of the conveyors 71 and 76.

In the operation of the device the articles to be dipped are essentially carried by the conveyors 71 and 76. The conveyor 71 functions as a charging conveyor for the articles to be moved to the tank or vat 77 and the conveyor 76 functions as a discharge conveyor for the dipped articles removed from the tank or vat. An article to be dipped is initially disposed upon conveyor 71 between two adjacent spacer bars 57. The timing of the machine is such that when the sleeve 54 moves forwardly, that is from right to left as viewed in Figs. 1, 2 and 4, the driving lugs 76' engage in the interstices of the conveyor 71 and thereby said conveyor is moved forwardly carrying the article to be dipped. As each spacer bar 57 moves beyond roll 70 the driving lugs 76' become disengaged from conveyor 71 but immediately thereafter engage in the interstices of the dipping conveyor 95. At this period of operation the dipping conveyor, of course, is at its uppermost position of travel and is in a common plane with the charging conveyor 71. Hence, the article to be dipped is moved from the conveyor 71 to the conveyor 95. The spacing of adjacent bars 57 is correlated to the width of the dipping tank, or the length of the conveyor 95 in such fashion that when one spacer bar has moved completely across the width of the tank, the sleeve 54 will have completed its forward travel and hence forward movement of the conveyors is stopped. At this period the cams 37 and 38 move in such fashion that the U-shaped frame 83 moves downwardly into the vat 77 whereby the article transferred to the upper pass of the conveyor 95 is carried downwardly into the vat. The vat, of course, carries a liquid which is adapted to treat in a desired fashion the article which is immersed therein.

During the period that the dipping conveyor 95 moves downwardly in the tank, the sleeve 54 moves rearwardly along the guide bar 53 until the pawl 59 has moved behind an end 58 of an adjacent spacer bar 57. At this period, the pin 47 carried by the crank arm 45 commences its movement through the slot 48 and hence the sleeve 54 remains stationary behind the adjacent spacer bar 57. This provides a sufficient period of time for the dipping liquid to accomplish its purpose relative to the article being treated.

During the period that the pin 47 moves forwardly in the slot 48 the arms 39 function to raise the conveyor 95, as hereinbefore described, until the upper pass of said conveyor is in the same plane with the upper passes of the conveyors 71 and 76. When this parallel relationship obtains, the pin 47 will have completed its movement through the slot 48 and hence further movement of the cam causes the sleeve 54 to move forwardly thereby moving all of the conveyors including the dipping conveyor 95. In this fashion the article freshly dipped is moved from the dipping conveyor 95 to the discharge conveyor 76 and another article previously charged to the conveyor 71 is carried onto the surface of the dipping conveyor 95. The operation is then repeated.

In handling predetermined types of articles it is sometimes desirable to guard against endwise movement of the articles upon the dipping conveyor 95 during the period that the conveyor is moved downwardly and upwardly in the vat 77. To accomplish this end a pair of partitions 96 are positioned in the interior of the vat adjacent the members 84 of the U-shaped support 83. Each of the partitions may be of an area substantially equal to the sectional area of the vat and each may be provided with a vertical slot 97 through which the end portions of the horizontal member 85 may move.

It can readily be seen that the present device provides a convenient and efficient mechanism for automatically dipping articles, the device comprising a charging conveyor, a dipping conveyor and a discharge conveyor, all of which are operated intermittently and in simultaneous timed relationship to each other whereby an article charged to the charging conveyor between an adjacent pair of spacer bars is carried through the cycle of being deposited upon the dipping conveyor, being dipped and being discharged from the dipping conveyor to the discharge conveyor. One of the specific uses to which the present invention is adapted is the dipping of foodstuffs such as dressed chickens which are placed in a plastic bag and are dipped by the mechanism into hot water contained in the vat. Of course, it is contemplated that means be provided for maintaining the liquid in the vat at a desired temperature. Such means, of course, is conventional and is not illustrated. It can readily be seen that the present device can be used for many other specific purposes and it is not intended that it be specifically limited to the dipping of dressed fowl or the dipping of foodstuffs since it is also adapted for the dipping of substantially any type of article.

I claim as my invention:

1. A device for dipping articles comprising an open top vat for holding a dipping material, a dipping member, means for vertically moving said dipping member into and out of said vat, an endless flexible dipping conveyor having a horizontally movable upper pass and mounted upon said dipping member for holding an article to be dipped, a movable charging conveyor having a horizontally movable upper pass and a movable discharge conveyor having a horizontally movable upper pass, said conveyors being disposed in end-abutting relationship to said dipping conveyor and with their upper passes in a substantially common plane when said dipping member is in its outer position relative to said vat, and endless chain means movable in timed relationship with the moving means of the dipping member for simultaneously moving all of said conveyors to transfer an article to be dipped from the upper pass of the charging conveyor to the upper pass of the dipping conveyor and to transfer a dipped article from the upper pass of the dipping conveyor to the upper pass of said discharge conveyor.

2. A device for dipping articles which comprises, a frame, an endless charging conveyor mounted on said frame for carrying an article to be dipped, an endless discharge conveyor mounted on said frame in longitudinal spaced relationship to said charging conveyor for carrying a dipped article, a dipping vat carried between said conveyors for holding a dipping material, a dipping conveyor mounted for movement into and out of said vat for dipping an article carried by said dipping conveyor, an endless flexible drive element carried by said frame having an upper pass adjacent said charging and discharge conveyors and adjacent said dipping conveyor when in its outer position with respect to said vat, means for moving said dipping conveyor into and out of said vat, means for moving said flexible drive element in timed relationship with said dipping conveyor moving means to move said drive element when said dipping conveyor is in its outer position with respect to said vat, and means for engaging said flexible drive element and all of said conveyors to move all of said conveyors with said flexible drive element to transfer an article to be dipped from said charging conveyor to the dipping conveyor and to transfer a dipped article from the dipping conveyor to the discharge conveyor.

3. A device for dipping articles which comprises, a frame, an endless charging conveyor mounted on said frame for carrying an article to be dipped, an endless discharge conveyor mounted on said frame in longitudinal spaced relationship to said charging conveyor for carrying a dipped article, a dipping vat carried between said conveyors for holding a dipping material, a dipping conveyor mounted for movement into and out of said vat for dipping an article carried by said dipping conveyor, an endless flexible drive element carried by said frame having an upper pass adjacent said charging and discharge conveyors and adjacent said dipping conveyor when in its outer position with respect to said vat, means for moving said dipping conveyor into and out of said vat, means for moving said flexible drive element in timed relationship with said dipping conveyor moving means to move said drive element when said dipping conveyor is in its outer position with respect to said vat, and means carried by said flexible drive element for engaging said flexible drive element and all of said conveyors to move all of said conveyors with said flexible drive element to transfer an article to be dipped from said charging conveyor to the dipping conveyor and to transfer a dipped article from the dipping conveyor to the discharge conveyor.

4. In a device for dipping articles having a vat for a dipping liquid and a dipping member movable vertically into and out of said vat, a conveyor system comprising an endless flexible wire mesh charging conveyor having a horizontal upper pass, an endless flexible wire mesh discharge conveyor having a horizontal upper pass and an endless flexible wire mesh dipping conveyor having a horizontal upper pass, the latter being carried by said dipping member and being interposed between the other conveyors in end abutting relationship and with the upper passes of all the conveyors in a common plane when said dipping member is in its outer position relative to said vat, endless drive means having an upper pass adjacent the upper passes of said conveyors, means carried by said drive means for engaging in the interstices of the wire meshes of the upper passes of said conveyors, and means for moving said drive means to simultaneously move all of said conveyors.

5. In a device for dipping articles having a vat for a dipping liquid and a dipping member movable vertically into and out of said vat, a conveyor system comprising an endless flexible wire mesh charging conveyor having a horizontal upper pass, an endless flexible wire mesh discharge conveyor having a horizontal upper pass and an endless flexible wire mesh dipping conveyor having a horizontal upper pass, the latter being carried by said dipping member and being interposed between the other conveyors in end abutting relationship and with the upper passes of all the conveyors in a common plane when said dipping member is in its outer position relative to said vat, endless drive means having an upper pass adjacent the upper passes of said conveyors, means carried by said drive means for engaging in the interstices of the wire meshes of the upper passes of said conveyors, and means for moving said drive means in timed relationship with the movement of the vertically movable dipping member to simultaneously move all of said conveyors.

6. In a device for dipping articles having a vat for a dipping liquid and a dipping member movable vertically into and out of said vat, a conveyor system comprising an endless flexible wire mesh charging conveyor having a horizontal upper pass, an endless flexible wire mesh discharge conveyor having a horizontal upper pass and an endless flexible wire mesh dipping conveyor having a horizontal upper pass, the latter being carried by said dipping member and being interposed between the other conveyors in end abutting relationship and with the upper passes of all the conveyors in a common plane when said dipping member is in its outer position relative to said vat, a pair of laterally spaced endless chains one being disposed adjacent each lateral side of said conveyors, spacer bars carried transversely upon said opposite chains and positioned above the upper passes of said conveyors, drive lugs carried by said spacer bars engageable in the interstices of the mesh of said conveyors, and means for moving said chains to simultaneously move all of said conveyors.

7. A device for dipping articles comprising a vat for holding a dipping material, a vertically movable dipping member, means for moving said dipping member vertically into and out of said vat, a movable endless flexible dipping conveyor mounted upon said dipping member for holding an article to be dipped, a movable charging conveyor disposed in substantially end-abutting relationship with the conveyor on the dipping member when said member is in its uppermost position, means for moving said conveyors, and means for engaging said conveyor-moving means and said conveyors to move said conveyors when the conveyor on the dipping member is in its uppermost position in substantially abutting relationship with the charging conveyor.

8. A device for dipping articles comprising a vat for holding a dipping material, a vertically movable dipping member, means for moving said dipping member vertically into and out of said vat, a movable endless flexible dipping conveyor having a substantially horizontal upper pass mounted upon said dipping member for holding an article to be dipped upon the upper pass of the conveyor, a movable endless charging conveyor having a substantial horizontal upper pass, the upper pass of said charging conveyor being substantially coplanar and in end abutting relationship to the upper pass of the conveyor on the dipping member when said member is in its uppermost position, means for moving said conveyors, and means for engaging said conveyor-moving means and said conveyors to move the upper passes of said conveyors when the conveyor on the dipping member is in its uppermost position.

References Cited in the file of this patent

UNITED STATES PATENTS

| Number | Name | Date |
|---|---|---|
| 1,960,339 | Howard | May 29, 1934 |
| 2,428,115 | Howard | Sept. 30, 1947 |